(12) United States Patent
Ellis

(10) Patent No.: US 12,384,291 B1
(45) Date of Patent: Aug. 12, 2025

(54) U-TURN SIGNAL

(71) Applicant: Matthew Ellis, Lexington, KY (US)

(72) Inventor: Matthew Ellis, Lexington, KY (US)

( * ) Notice: Subject to any disclaimer, the term of this patent is extended or adjusted under 35 U.S.C. 154(b) by 238 days.

(21) Appl. No.: 18/233,916

(22) Filed: Aug. 15, 2023

(51) Int. Cl.
 *B60Q 1/34* (2006.01)
 *B60Q 1/26* (2006.01)
(52) U.S. Cl.
 CPC ........... *B60Q 1/346* (2013.01); *B60Q 1/2696* (2013.01)
(58) Field of Classification Search
 CPC .............................. B60Q 1/346; B60Q 1/2696
 See application file for complete search history.

(56) References Cited

U.S. PATENT DOCUMENTS

| | | | |
|---|---|---|---|
| 5,731,755 A | 3/1998 | Boxer | |
| 6,195,001 B1* | 2/2001 | Haddad | B60Q 1/34 340/475 |
| 7,245,209 B2 | 7/2007 | Sanicola | |
| 7,417,534 B2 | 8/2008 | Quach et al. | |
| 8,519,840 B1* | 8/2013 | Banks | B60Q 1/34 340/475 |
| 10,144,346 B1* | 12/2018 | Dohan | G06F 3/167 |
| 10,604,065 B2* | 3/2020 | Dohan | B60Q 1/34 |
| 10,857,936 B2* | 12/2020 | James | B60Q 1/2696 |
| 11,407,365 B2 | 8/2022 | Stein | |
| 11,524,626 B1 | 12/2022 | Guirguis | |
| 2005/0168347 A1* | 8/2005 | Sanicola | B60Q 1/38 340/815.45 |
| 2007/0069881 A1* | 3/2007 | Dohan | B60Q 1/34 340/465 |
| 2007/0132573 A1* | 6/2007 | Quach | B60Q 1/381 340/475 |
| 2016/0207449 A1 | 7/2016 | Nobel et al. | |
| 2016/0229336 A1* | 8/2016 | Ali | B60Q 1/34 |
| 2020/0238898 A1* | 7/2020 | James | B60Q 1/343 |
| 2021/0188163 A1* | 6/2021 | Kern | H04N 7/183 |
| 2024/0123900 A1* | 4/2024 | Brewster, Sr. | B60Q 1/38 |

FOREIGN PATENT DOCUMENTS

| | | |
|---|---|---|
| WO | WO1998008708 | 3/1988 |
| WO | WO2022090785 | 5/2022 |

* cited by examiner

*Primary Examiner* — Bryon T Gyllstrom
(74) *Attorney, Agent, or Firm* — BUSINESS PATENT LAW, PLLC

(57) ABSTRACT

A remote controlled flashing U-turn signal that can visually warn vehicles of a U-turn. The current flashing U-turn signal can be releasably attached to one or more outer or inner sections of the motor vehicle.

20 Claims, 9 Drawing Sheets

U-TURN SIGNAL

BACKGROUND OF THE INVENTION

A. Field of the Invention

Among other things, the present invention is flashing U-turn signal for attachment to a motor vehicle. Use of the flashing U-turn signal can identify to oncoming and rearward vehicles of the intent to make a U-turn. The current flashing U-turn signal is releasably attached to one or more outer or inner sections of the motor vehicle.

B. Description of the Previous Art

Any discussion of references cited in this Description of the Previous Art merely summarizes the disclosures of the cited references and Applicant makes no admission that any cited reference or portion thereof is relevant prior art. Applicant reserves the right to challenge the accuracy, relevancy and veracity of the cited references.

References that may indicate a state-of-the-art for the current invention include 1) U.S. Ser. No. 11/407,365B2-Stien; 2) US20160207449A1-Nobel et al; 3) U.S. Pat. No. 5,731,755-Boxer; 4) WO2022090785A1-Davoodabadi; 5) WO1998008708A1-Boxer; 6) U.S. Ser. No. 11/524,626B1-Guirguis; 7) U.S. Pat. No. 7,245,209B2-Sanicola; and 8) U.S. Pat. No. 7,417,534B2-Quach et al.

Among other things, the above references do not disclose a remote controlled flashing U-turn signal adapted for releasable attachment to a motor vehicle; the remote controlled flashing U-turn signal comprising: a) a first housing comprising: a voltage store, a transceiver, a microprocessor, a LED array, a software controlling the flashing U-turn signal and the microprocessor, a motion sensor detecting completion of a U-turn and first contacts interconnecting the voltage store, the transceiver, the microprocessor, the software, the LED array, the flashing U-turn signal and the motion sensor, wherein the flashing U-turn signal ceases after completion of the U-turn; and b) a second housing comprising: a remote touch activator, a transmitter adapted to wirelessly communicate with the transceiver and the microprocessor, a battery and second contacts interconnecting the battery, the remote touch activator and the transmitter.

SUMMARY OF THE INVENTION

Prior to the current invention, it is believed there were no releasably attachable U-turn signals for motor vehicles that did not require additional wiring for the motor vehicle. Meeting a long felt but unfilled need, the present invention provides an inexpensive functional flashing U-turn signal visible by drivers in proximity of the flashing U-turn signal that warns the nearby drivers of an upcoming U-turn. It is believed that use of the current invention can reduce motor vehicle accidents.

An aspect of the present invention is to provide a remote control activated flashing U-turn signal.

Still another aspect of the present invention is to provide a flashing U-turn signal that is easily attachable to one or more outer and or inner sections of the motor vehicle.

It is still another aspect of the present invention to provide a flashing U-turn signal that automatically ceases to operate after the U-turn is completed.

Yet another aspect of the present invention is to provide an adjustable light panel where the light panel is adjustable relative to horizontal, vertical or any other plane between horizontal and vertical.

Still another aspect of the present invention is to provide a flashing U-turn signal where the brightness of the flashing U-turn signal is adjusted relative to ambient illumination surrounding the motor vehicle.

It is still another aspect of the present invention to provide a touch activator for initiating the flashing U-turn signal.

Yet another aspect of the present invention is to provide a flashing U-turn signal that is initiated via wireless communication.

Still another aspect of the present invention is to provide a flashing U-turn signal that can be powered by a mini solar panel.

A preferred embodiment of the current invention can be described as a remote controlled flashing U-turn signal adapted for releasable attachment to a motor vehicle; the remote controlled flashing U-turn signal comprising: a) an adhesive adhered to an outward portion of a first housing; the adhesive providing releasable attachment to a section of the motor vehicle; b) the first housing comprising: a voltage store, a transceiver, a microprocessor, a light panel, a software controlling the flashing U-turn signal and the microprocessor, a motion sensor detecting completion of a U-turn and first contacts interconnecting the voltage store, the transceiver, the microprocessor, the software, the light panel, the flashing U-turn signal and the motion sensor, wherein the flashing U-turn signal ceases after completion of the U-turn; and c) a second housing comprising: a remote touch activator, a transmitter adapted to wirelessly communicate with the transceiver and the microprocessor, a battery and second contacts interconnecting the battery, the remote touch activator and the transmitter.

Another preferred embodiment of the current invention can be described as a remote controlled flashing U-turn signal adapted for releasable attachment to a motor vehicle; the remote controlled flashing U-turn signal comprising: a) an outward portion of a first housing providing releasable attachment of the first housing to a section of the motor vehicle; b) the first housing comprising a voltage store, a transceiver, a microprocessor, a light panel, a software controlling the flashing U-turn signal and the microprocessor, a motion sensor detecting completion of a U-turn and first contacts interconnecting the voltage store, the transceiver, the microprocessor, the software, the light panel, the flashing U-turn signal and the motion sensor, wherein the flashing U-turn signal ceases after completion of the U-turn; and c) a second housing comprising: a remote touch activator, a transmitter adapted to wirelessly communicate with the transceiver and the microprocessor, a battery and second contacts interconnecting the battery, the remote touch activator and the transmitter.

Yet another preferred embodiment of the current invention can be described as a remote controlled flashing U-turn signal adapted for releasable attachment to a motor vehicle; the remote controlled flashing U-turn signal comprising: a) a first housing comprising: a voltage store, a transceiver, a microprocessor, a LED array, a software controlling the flashing U-turn signal and the microprocessor, a motion sensor detecting completion of a U-turn and first contacts interconnecting the voltage store, the transceiver, the microprocessor, the software, the LED array, the flashing U-turn signal and the motion sensor, wherein the flashing U-turn signal ceases after completion of the U-turn; and b) a second housing comprising: a remote touch activator, a transmitter adapted to wirelessly communicate with the transceiver and the microprocessor, a battery and second contacts interconnecting the battery, the remote touch activator and the transmitter.

It is the novel and unique interaction of these simple elements which creates the apparatus and methods, within the ambit of the present invention. Pursuant to Title 35 of the United States Code, descriptions of preferred embodiments follow. However, it is to be understood that the best mode descriptions do not limit the scope of the present invention.

DESCRIPTION OF THE PREFERRED EMBODIMENTS

Although the disclosure hereof is detailed to enable those skilled in the art to practice the invention, the embodiments published herein merely exemplify the present invention.

Figure 1:
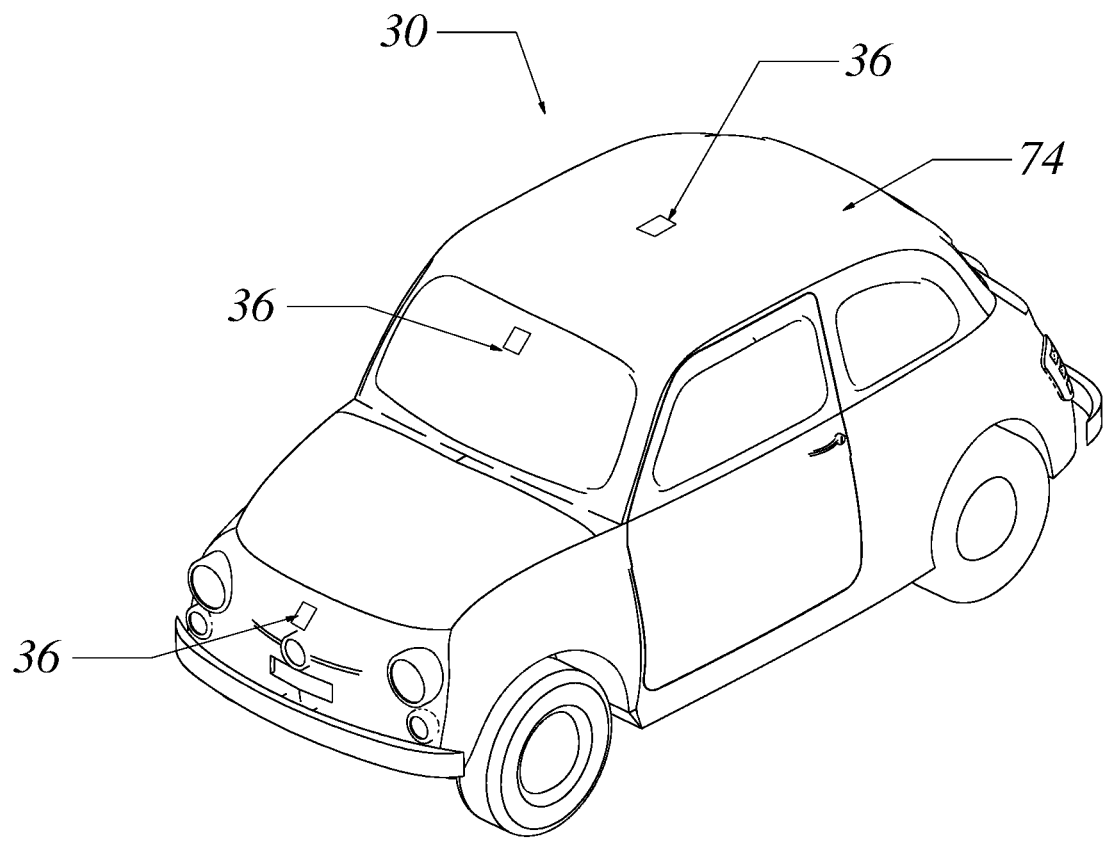
FIG. 1 portrays motor vehicle (30) with a plethora of sections (36) available for the placement of a flashing U-turn signal (300).

FIG. 1 portrays motor vehicle (30) with a plethora of sections (36) available for placement of U-turn signal (300). As shown in FIG. 1, the motor vehicle is what is commonly known as an automobile. However, the present invention is also functional with trucks, motorcycles and any other land-type motor vehicle (30). U-turn signal (300) can be connected to the outside or the inside of motor vehicle (30).

Figure 2:
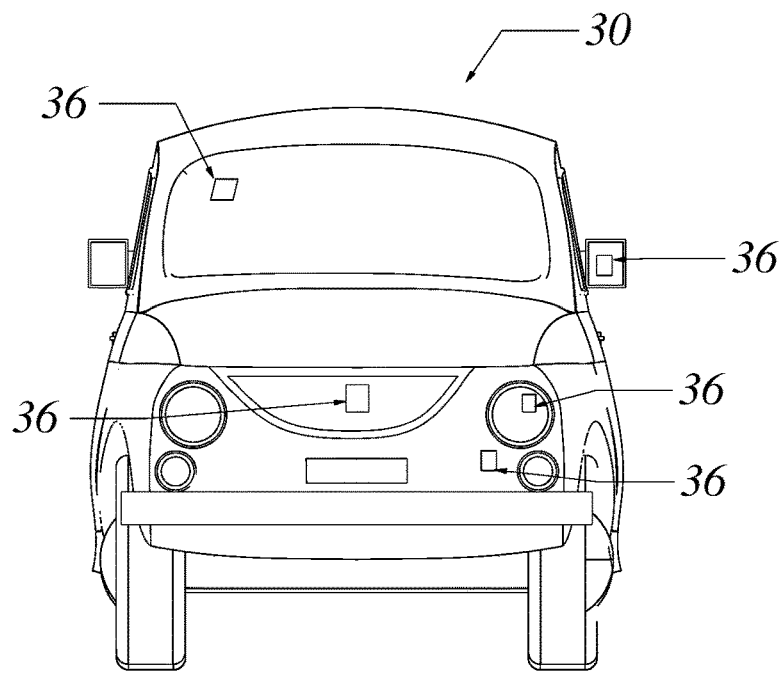
FIG. 2 is an anterior perspective of motor vehicle (30) including a plurality of sections (36) available for placement of flashing U-turn signal (300).

FIG. 2 is an anterior perspective of motor vehicle (30) including a plurality of sections (36) available for placement of U-turn signal (300).

Figure 3:
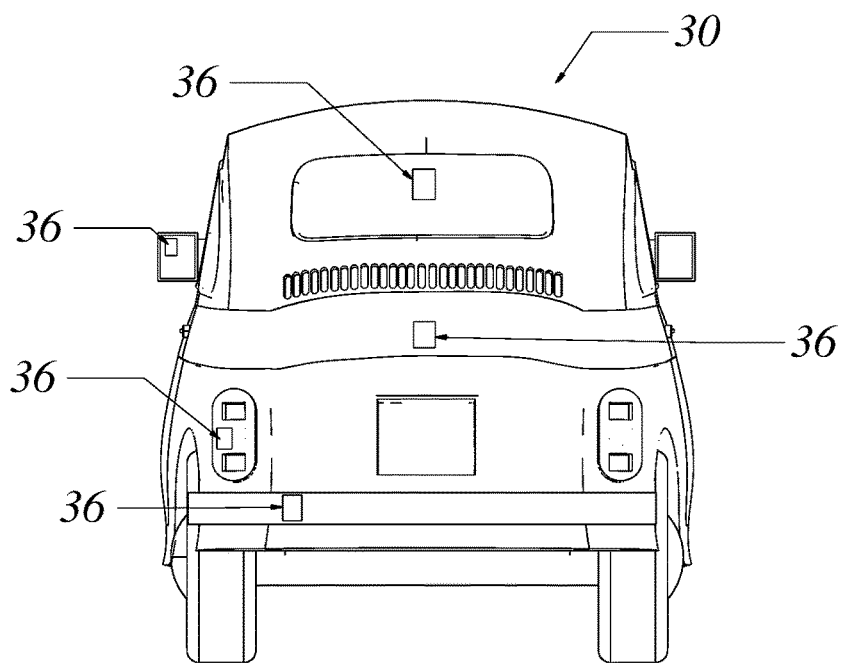
FIG. 3 is a posterior perspective of motor vehicle (30) including a plurality of sections (36) available for placement of flashing U-turn signal (300).

FIG. 3 is a posterior perspective of motor vehicle (30) including a plurality of sections (36) available for placement of U-turn signal (300).

Figure 4:
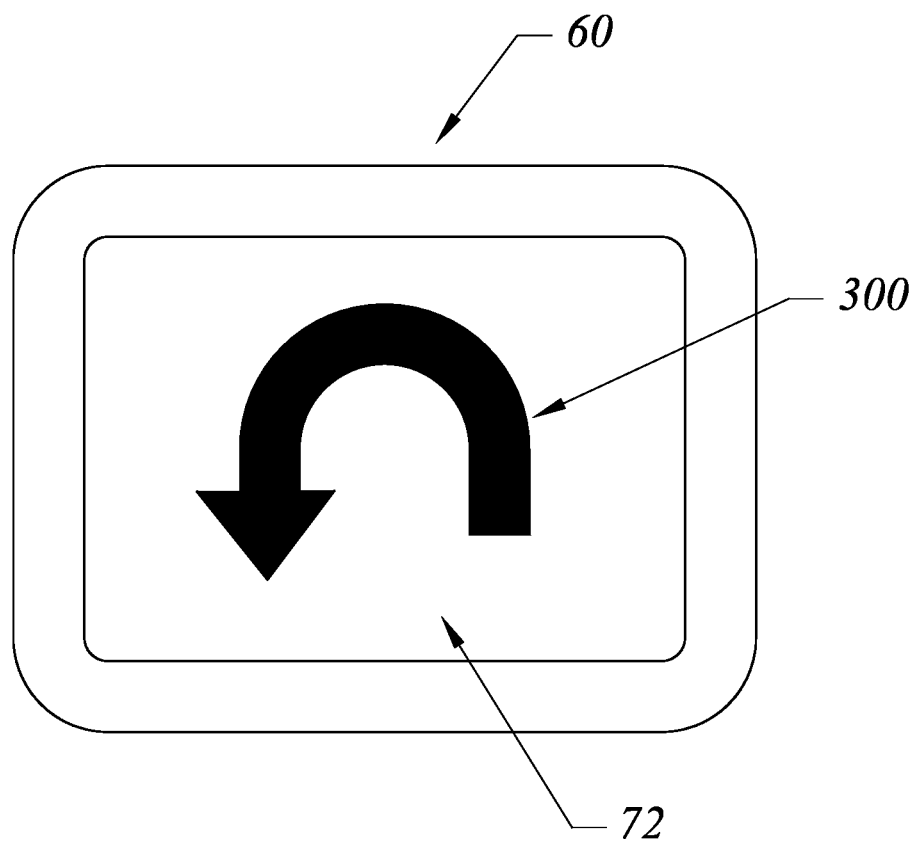
FIG. 4 is a frontal view of a first housing (60) containing an activated flashing U-turn signal (300).

FIG. 4 is a frontal view of a first housing (60) containing an activated U-turn signal (300). As long as first housing (60) includes window (72) allowing visualization of activated U-turn signal (300), first housing (60) can be manufactured from any materials acceptable in the art. Preferred embodiments of first housing (60) can utilize metals, soft polymers, any other composition acceptable in the art or a combination thereof.

Figure 5:
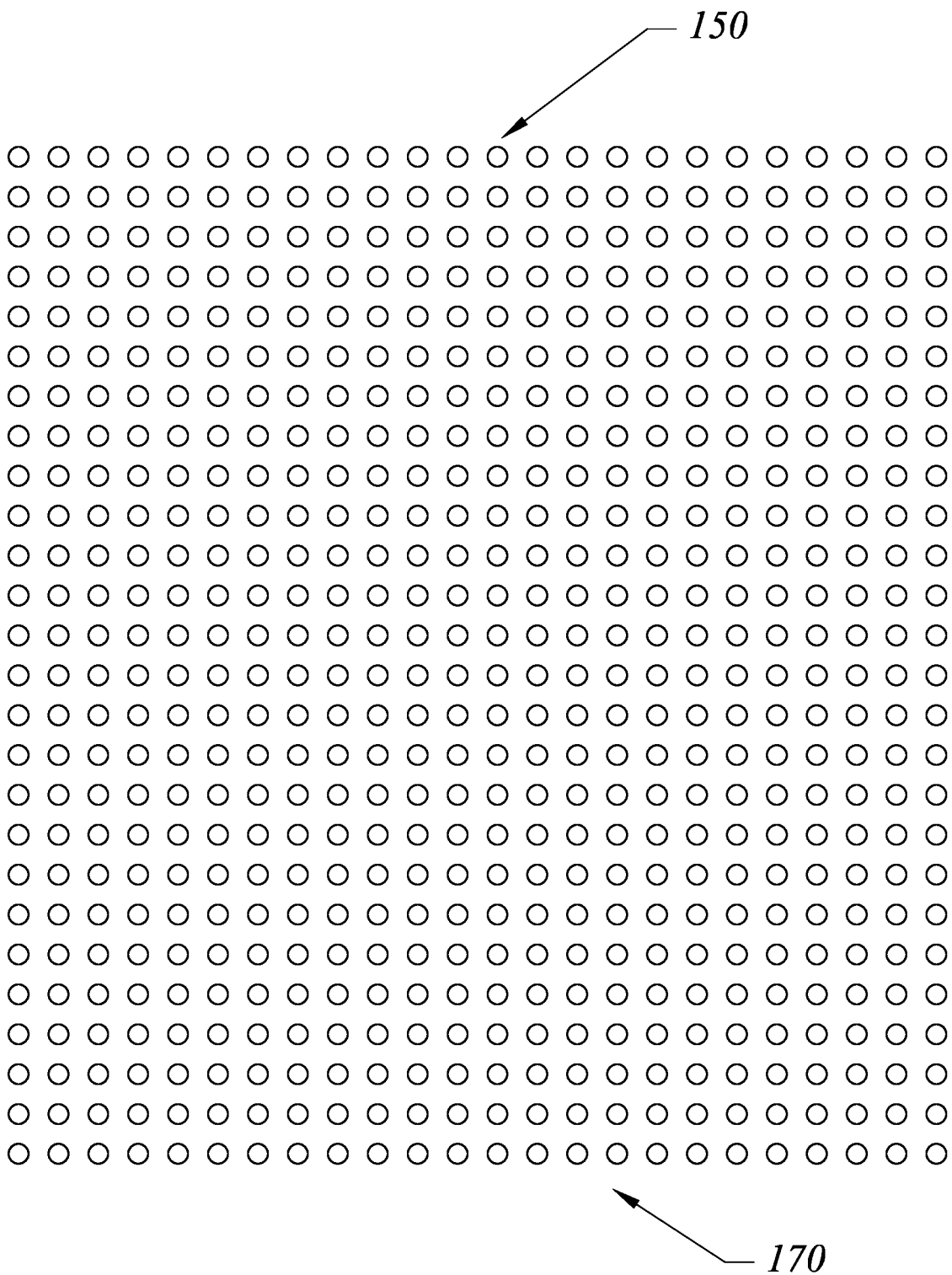
FIG. 5 portrays light panel (150) or LED (170) that can be incorporated into first housing (60).

FIG. 5 portrays light panel (150) or LED array (170) that can be incorporated into first housing (60).

Figure 6:
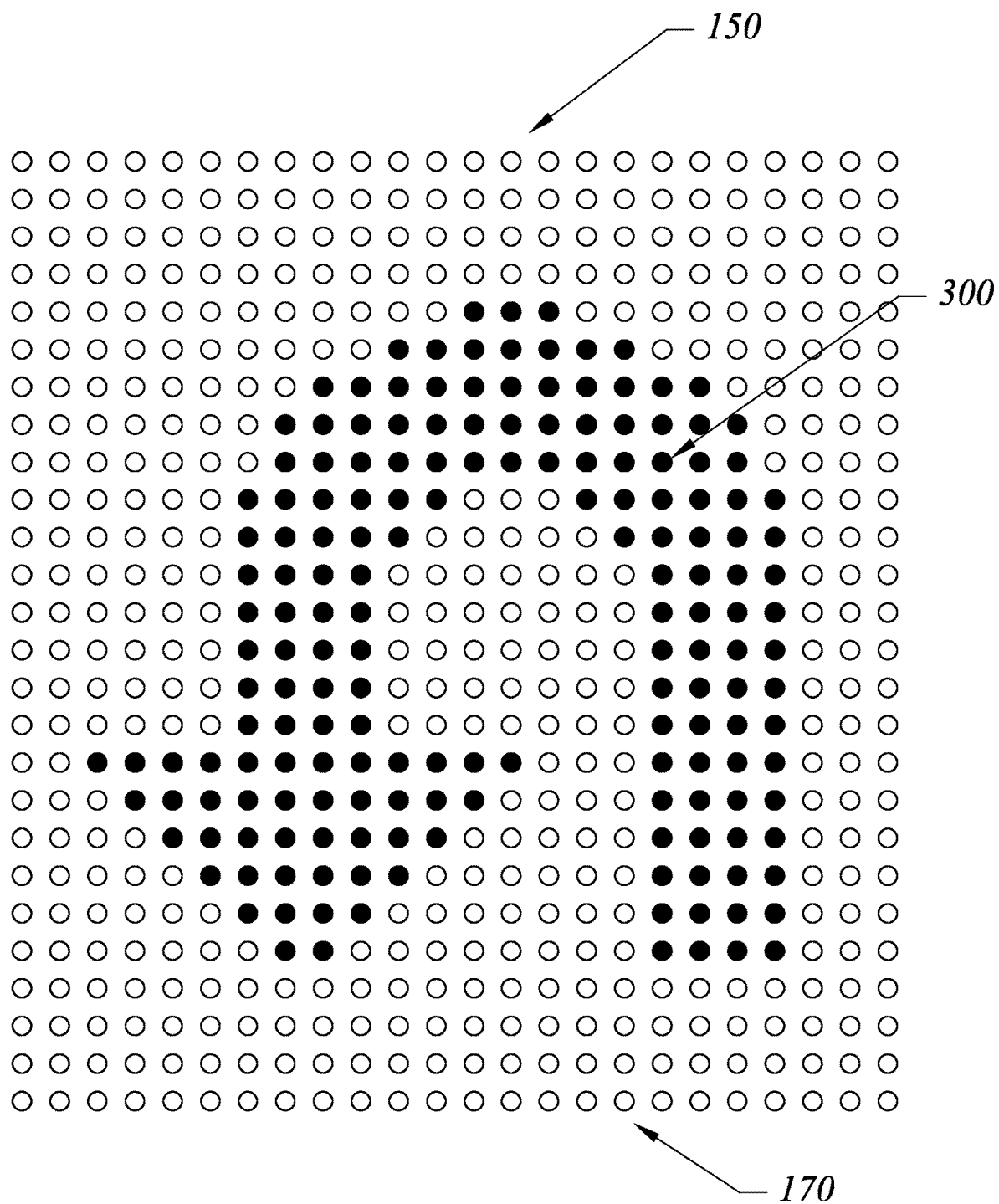
FIG. 6 portrays an activated/flashing light panel (150) or LED (170) incorporated into first housing (60).

FIG. 6 portrays an activated/flashing light panel (150) or LED array (170) incorporated into first housing (60). Select preferred embodiments of utilize LED arrays (170). In embodiments of the current invention, when light panel (150) or LED array (170) is activated, flashing U-turn signal (300) is visible and emits from window (72) of first housing (60).

Figure 7:
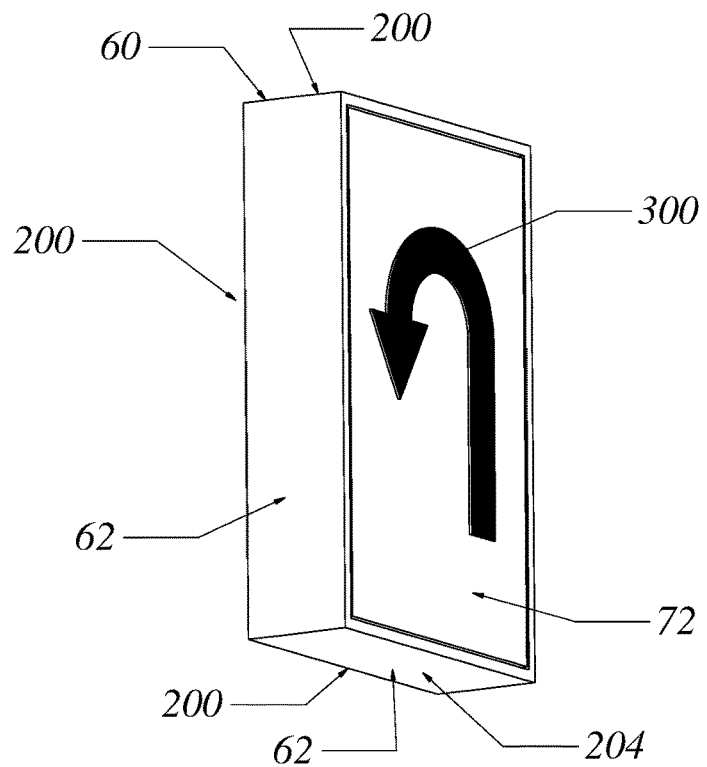
FIG. 7 is a perspective of first housing (60) showing an activated/flashing U-turn signal (300), window (72) and adhesive (200) adhered to or suction (204) formed in one or more portions of first housing (60).

FIG. 7 is a perspective of first housing (60) showing activated/flashing U-turn signal (300), window (72) and adhesive (200) adhered to one or more portions of first housing (60). Any adhesive capable of releasably attaching first housing (60) to one or more sections (36) of motor vehicle (30) without peeling or damaging the exterior of motor vehicle (30) on removal of first housing (60) is acceptable for use with first housing (60). Preferred embodiments of first housing (60) can utilize adhesives (200), suction (204) or combinations thereof to attach housing (60) to motor vehicle (30). Suction (204) can be provided by incorporating one or more suction cups into first housing (60).

Figure 8:
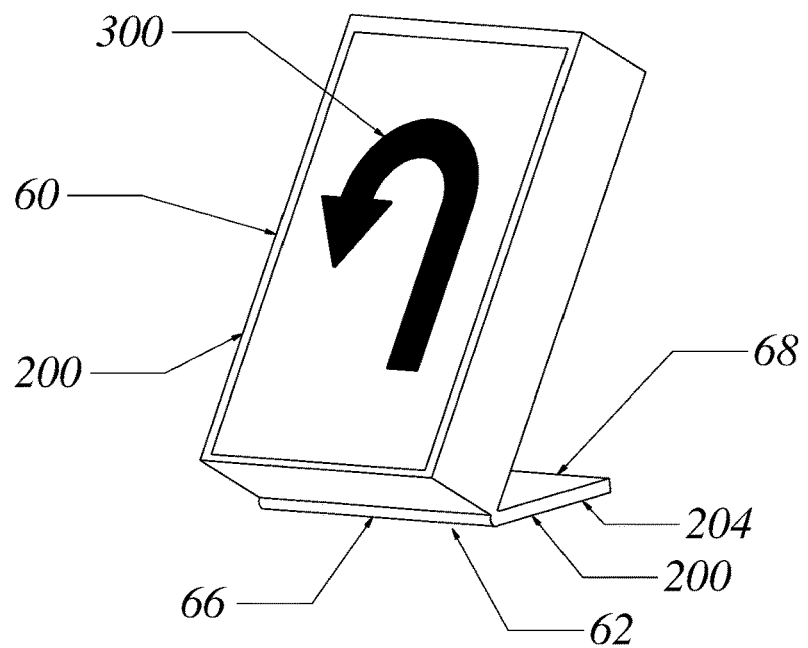
FIG. 8 is a perspective of first housing (60) showing an activated/flashing U-turn signal (300), window (72), elbow (66) and adhesive (200) adhered to one or suction (204) formed in one or more portions of first housing (60).

FIG. 8 is a perspective of first housing (60) showing activated/flashing U-turn signal (300), window (72), elbow (66) and adhesive (200) or suction (204) attaching first housing (60) to one or more section (36) of motor vehicle (30). The FIG. 8 embodiment of first housing (30) can include elbow (66) allowing adjustment of light panel (150) or LED array (170) relative to base (68) of first housing (60). By way of illustration and not limitation, base (68) can be attached to roof (74) of motor vehicle (30) and light panel (150) or LED array (170) and its accompanying window (72) can be rotated about elbow (66) such that light panel (150) can be perpendicular to roof (74).

Figure 9:
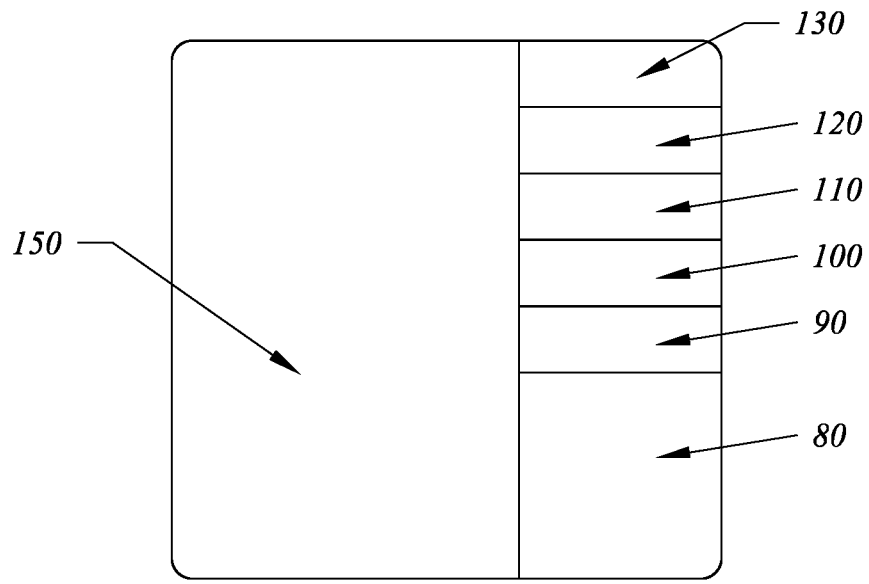
FIG. 9 is a diagram of a preferred operational embodiment of flashing U-turn signal (300).

As shown in the FIG. 9, a preferred operational embodiment of U-turn signal (300) and first housing (60) can be provided with voltage store (80), transceiver (90), microprocessor (100), light panel (150) or LED array (170), software (110), a motion sensor (120) and a light sensor (130). The preferred operational embodiment also includes first contacts interconnecting voltage store (80), transceiver (90), microprocessor (100), software (110), light panel (150) or LED array (170), flashing U-turn signal (300), motion sensor (120) and light sensor (130). Voltage store (80) can be a voltage store (80) acceptable in the art, such as a battery. When motion sensor (120) senses that the U-turn was completed, the motion sensor instructs microprocessor (100) and software (110) to stop operation of U-turn signal (300). After transceiver (90) is activated, microprocessor (100) and software (110) cause light panel (150) to flash U-turn signal (300) until motion sensor (120) calculates that the U-turn was completed. Light sensor (130) measures ambient light associated with U-turn signal (300) and instructs microprocessor (100) and software (110) to darken or lighten U-turn signal (300) relevant to ambient light conditions.

Figure 10:
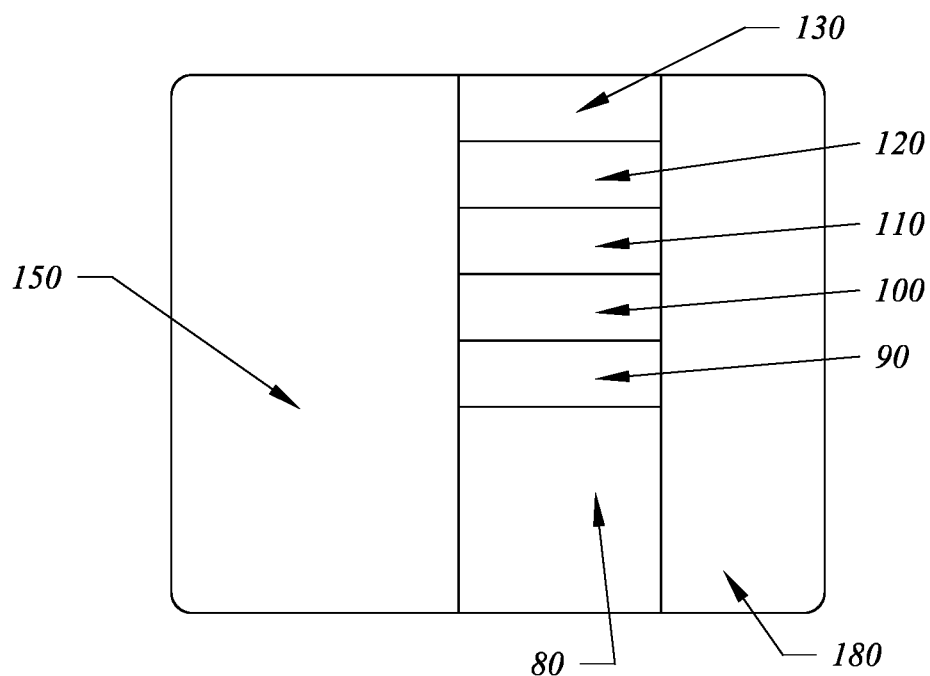
FIG. 10 is a diagram of another preferred operation embodiment of flashing U-turn signal (300).

Except for the addition of solar panel (180), the structures enabled in FIG. 10 are identical to the structures and functions enabled in FIG. 9. In FIG. 10, housing (60) includes a solar panel (180) connected to the microprocessor (100) and software (110). Solar panel (180) is adapted to recharge the voltage store (80) and/or supplement voltage required for operation of remote controlled U-turn signal (300).

Figure 11:
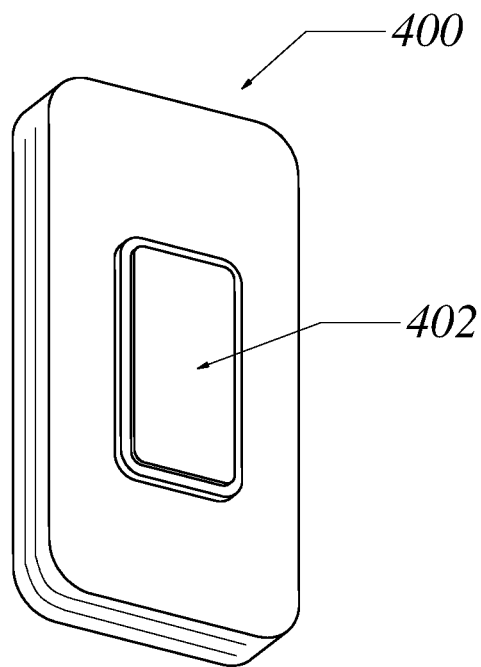
FIGS. 11 and 12 illustrate a first type of remote control (400) for activating flashing U-turn signal (300).
Figure 12:
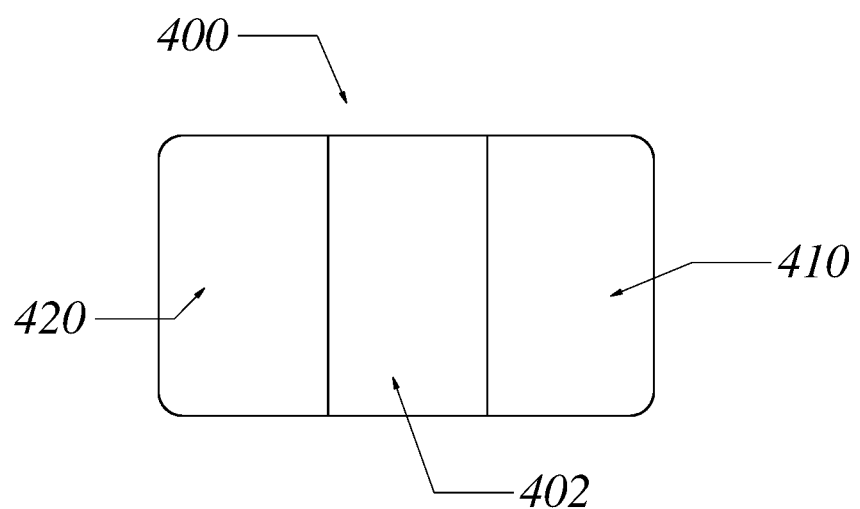

FIGS. 11 and 12 illustrate a first type of remote control (400) for activating flashing U-turn signal (300). Second housing (400) includes remote touch activator (402), transmitter (410) adapted to wirelessly communicate with the transceiver (90) and the microprocessor (100) and software (110). In select preferred embodiments, remote touch activator (402) can be a pressure sensor or a touch sensor.

Figure 13:
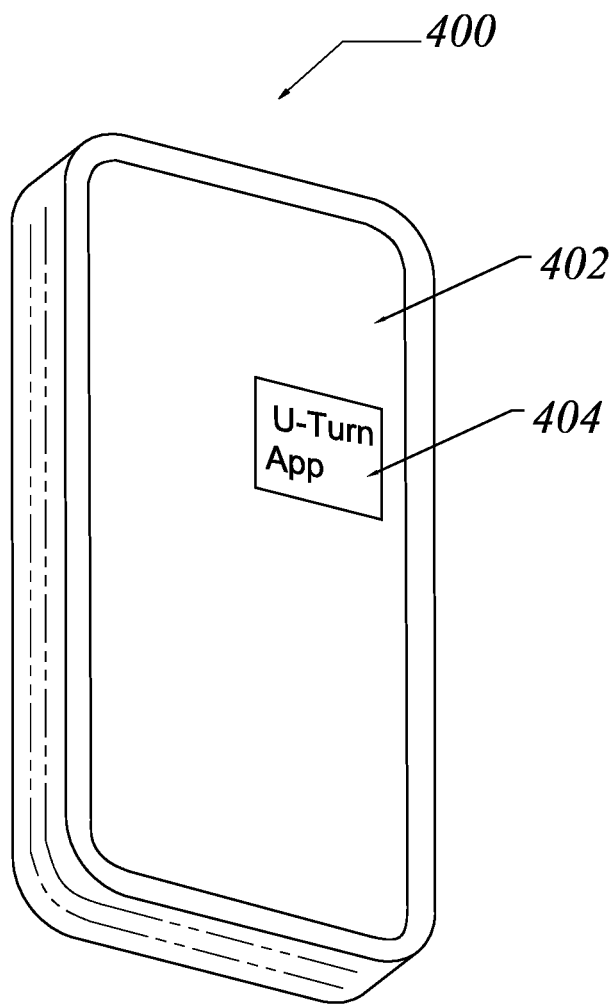
FIG. 13 illustrates an alternative type of remote control (400) for activating flashing U-turn signal (300).

FIG. 13 illustrates an alternative type of remote control (400) for activating flashing U-turn signal (300). The present invention can include an app for a smart phone (400). After downloading the app, the smart phone user can utilize the smart phone's touch screen (402) to activate the flashing U-turn signal (300) by using the smart phone to signal transceiver (90), microprocessor (100) and software (110) of first housing (60). After receiving the activation signal from the smart phone, transceiver (90), microprocessor (100) and software (110) send return signal deactivating the initiating request from the smart phone.

Depending on predetermined engineering parameters, the flashing U-turn signal's transceiver (90) and transmitter (410) are compatible with a wireless cellular network, an IEEE 802.11 protocol and/or an IEEE 802.15.1 protocol.

Applicant has enabled, described and disclosed the invention as required by Title 35 of the United States Code.

What is claimed is:

1. A remote controlled flashing U-turn signal adapted for releasable attachment to a motor vehicle; the remote controlled flashing U-turn signal comprising:
    a) an adhesive adhered to an outward portion of a first housing; the adhesive providing releasable attachment to a section of the motor vehicle;
    b) the first housing comprising: a voltage store, a transceiver, a microprocessor, a light panel, a software controlling the flashing U-turn signal and the microprocessor, a motion sensor detecting completion of a U-turn and first contacts interconnecting the voltage store, the transceiver, the microprocessor, the software, the light panel, the flashing U-turn signal and the motion sensor, wherein the flashing U-turn signal ceases after completion of the U-turn; and
    c) a second housing comprising: a remote touch activator, a transmitter adapted to wirelessly communicate with the transceiver and the microprocessor, a battery and second contacts interconnecting the battery, the remote touch activator and the transmitter.

2. The remote controlled flashing U-turn signal of claim 1, wherein the first housing comprises a light sensor connected to the microprocessor for adjusting the brightness of the flashing U-turn signal relevant to ambient illumination.

3. The remote controlled flashing U-turn signal of claim 2, wherein the light panel is an LED array.

4. The remote controlled flashing U-turn signal of claim 3, wherein the transceiver and transmitter are compatible with a wireless cellular network, an IEEE 802.11 protocol and/or an IEEE 802.15.1 protocol.

5. The remote controlled flashing U-turn signal of claim 4, wherein the remote touch activator comprises:
    a) a pressure sensor, and/or
    b) a smart phone including an app programed to communicate with the transceiver.

6. The remote controlled flashing U-turn signal of claim 5, wherein the first housing comprises a solar panel connected to the microprocessor, the solar panel adapted to recharge the voltage store and/or supplement voltage required for operation of remote controlled U-turn signal.

7. The remote controlled flashing U-turn signal of claim 6, wherein the first housing comprises an elbow allowing adjustment of the LED array relative to a base of the first housing.

8. A remote controlled flashing U-turn signal adapted for releasable attachment to a motor vehicle; the remote controlled flashing U-turn signal comprising:
    a) an outward portion of a first housing providing releasable attachment of the first housing to a section of the motor vehicle;
    b) the first housing comprising a voltage store, a transceiver, a microprocessor, a light panel, a software controlling the flashing U-turn signal and the microprocessor, a motion sensor detecting completion of a U-turn and first contacts interconnecting the voltage store, the transceiver, the microprocessor, the software, the light panel, the flashing U-turn signal and the motion sensor, wherein the flashing U-turn signal ceases after completion of the U-turn; and
    c) a second housing comprising: a remote touch activator, a transmitter adapted to wirelessly communicate with the transceiver and the microprocessor, a battery and second contacts interconnecting the battery, the remote touch activator and the transmitter.

9. The remote controlled flashing U-turn signal of claim 8, wherein the first housing comprises a light sensor connected to the microprocessor for adjusting the brightness of the flashing U-turn signal relevant to ambient illumination.

10. The remote controlled flashing U-turn signal of claim 9, wherein the light panel is an LED array.

11. The remote controlled flashing U-turn signal of claim 10, wherein the outward portion of the first housing comprises an adhesive, a suction segment or a combination of the adhesive and suction segment.

12. The remote controlled flashing U-turn signal of claim 11, wherein the transceiver and transmitter are compatible with a wireless cellular network, an IEEE 802.11 protocol and/or an IEEE 802.15.1 protocol.

13. The remote controlled flashing U-turn signal of claim 12, wherein the remote touch activator comprises:
    a) a pressure sensor, and/or
    b) a smart phone including an app programed to communicate with the transceiver.

14. The remote controlled flashing U-turn signal of claim 13, wherein the first housing comprises a solar panel connected to the microprocessor, the solar panel adapted to recharge the voltage store and/or supplement voltage required for operation of remote controlled U-turn signal.

15. The remote controlled flashing U-turn signal of claim 14, wherein the first housing comprises an elbow allowing adjustment of the LED array relative to a base of the first housing.

16. A remote controlled flashing U-turn signal adapted for releasable attachment to a motor vehicle; the remote controlled flashing U-turn signal comprising:
    a) a first housing comprising: a voltage store, a transceiver, a microprocessor, a LED array, a software controlling the flashing U-turn signal and the microprocessor, a motion sensor detecting completion of a U-turn and first contacts interconnecting the voltage store, the transceiver, the microprocessor, the software, the LED array, the flashing U-turn signal and the motion sensor, wherein the flashing U-turn signal ceases after completion of the U-turn; and b) a second housing comprising: a remote touch activator, a transmitter adapted to wirelessly communicate with the transceiver and the microprocessor, a battery and second contacts interconnecting the battery, the remote touch activator and the transmitter.

17. The remote controlled flashing U-turn signal of claim 16, wherein the first housing comprises a light sensor connected to the microprocessor for adjusting the brightness of the flashing U-turn signal relevant to ambient illumination.

18. The remote controlled flashing U-turn signal of claim 17, wherein the transceiver and transmitter are compatible with a wireless cellular network, an IEEE 802.11 protocol and/or an IEEE 802.15.1 protocol.

19. The remote controlled flashing U-turn signal of claim 18, wherein the remote touch activator comprises:
   a) a pressure sensor, and/or
   b) a smart phone including an app programed to communicate with the transceiver.

20. The remote controlled flashing U-turn signal of claim 19, wherein the first housing comprises an elbow allowing adjustment of the LED array relative to a base of the first housing.

\* \* \* \* \*